US007830251B2

(12) United States Patent
Nishimiya

(10) Patent No.: US 7,830,251 B2
(45) Date of Patent: Nov. 9, 2010

(54) RECEIVING APPARATUS

(75) Inventor: Yusaku Nishimiya, Osaka (JP)

(73) Assignee: Panasonic Corporation, Osaka (JP)

( * ) Notice: Subject to any disclaimer, the term of this patent is extended or adjusted under 35 U.S.C. 154(b) by 309 days.

(21) Appl. No.: 12/065,741

(22) PCT Filed: Nov. 8, 2006

(86) PCT No.: PCT/JP2006/322227

§ 371 (c)(1),
(2), (4) Date: Mar. 5, 2008

(87) PCT Pub. No.: WO2007/055219

PCT Pub. Date: May 18, 2007

(65) Prior Publication Data

US 2009/0135004 A1 May 28, 2009

(30) Foreign Application Priority Data

Nov. 10, 2005 (JP) ............................ 2005-325677

(51) Int. Cl.
*G08B 1/08* (2006.01)
*G08G 1/123* (2006.01)
*G01C 21/00* (2006.01)

(52) U.S. Cl. ............................ 340/539.13; 340/995.13; 340/905; 340/995.17; 701/118; 701/201; 455/404.2

(58) Field of Classification Search ............ 340/539.13, 340/995.13
See application file for complete search history.

(56) References Cited

U.S. PATENT DOCUMENTS

| | | | | |
|---|---|---|---|---|
| 5,095,532 | A * | 3/1992 | Mardus | 455/186.1 |
| 5,432,542 | A * | 7/1995 | Thibadeau et al. | 725/35 |
| 5,900,825 | A * | 5/1999 | Pressel et al. | 340/905 |
| 6,868,331 | B2 * | 3/2005 | Hanebrink | 701/117 |

FOREIGN PATENT DOCUMENTS

| | | | |
|---|---|---|---|
| JP | 04-329709 | A | 11/1992 |
| JP | 05-118866 | A | 5/1993 |
| JP | 09-043335 | A | 2/1997 |
| JP | 10-126293 | A | 5/1998 |
| JP | 2001-169195 | A | 6/2001 |

OTHER PUBLICATIONS

International Search Report for PCT/JP2006/32227 dated Feb. 27, 2007.

* cited by examiner

*Primary Examiner*—Donnie L Crosland
(74) *Attorney, Agent, or Firm*—RatnerPrestia

(57) ABSTRACT

A receiving apparatus includes a receiving section for receiving a broadcast. The apparatus further includes a location detector for detecting the location of the receiving apparatus, a moving direction calculator for calculating a moving direction of the receiving apparatus based on the location detected by the location detector, and a controller for allowing a reproducing section to reproduce a part of or all of the broadcast received by the receiving section selectively based on the moving direction calculated by the moving direction calculator.

4 Claims, 2 Drawing Sheets

RECEIVING APPARATUS

THIS APPLICATION IS A U.S. NATIONAL PHASE APPLICATION OF PCT INTERNATIONAL APPLICATION PCT/JP2006/322227.

TECHNICAL FIELD

The present invention relates to a receiving apparatus for receiving a broadcast.

BACKGROUND ART

A conventional receiving apparatus will be described below. In addition to ordinary broadcasts, television and radio broadcasts provide a user with emergency broadcasts including traffic information and various warnings. If the emergency broadcasts are delivered while the user is listening to the ordinary broadcasts, a conventional receiving apparatus reproduces the emergency broadcasts, allowing the emergency broadcasts to interrupt the ordinary broadcasts.

Patent document 1 relates to the invention of the present application.

Upon not being relevant to a destination area the user move to, emergency broadcasts, such as traffic information, may be unnecessary for the user. In this case, the conventional receiving apparatus has a problem to delivering the emergency broadcasts, allowing the emergency broadcasts to often interrupt the broadcasts which the user listens to.

Patent Deference 1: Japanese Patent Laid-Open Publication No. 10-126293

SUMMARY OF THE INVENTION

In order to solve the problem, a receiving apparatus according to the present invention includes a receiving section for receiving a broadcast and a reproducing section for reproducing the received broadcast, and further includes a location detector for detecting the location of the receiving apparatus, a moving direction calculator for calculating a moving direction of the receiving apparatus based on the location detected by the location detector, and a controller for allowing the reproducing section to reproduce a part of the broadcast received by the receiving section or all of the broadcast selectively based on the moving direction calculated by the moving direction calculator.

In this structure, the controller first detects, according to the moving direction calculated by the moving direction calculator, a destination area which the receiving apparatus moves to. Then, If an emergency broadcast received by the receiving section is relevant to the destination area of the apparatus, the controller allows the reproducing section to selectively reproduce the emergency broadcast.

This operation prevents a user from listening a broadcast interrupted by an unnecessary emergency broadcast. The receiving apparatus selectively reproduces traffic jam information occurring in the destination area the user moves to, thus effectively providing the user with useful information, such as the traffic jam information.

REFERENCE NUMERALS

1 Receiving Apparatus
3 Receiving Section
6 Reproducing Section
7 Location Detector
8 Moving Direction Calculator
9 Controller
10 Registering Section
11 Memory

DETAILED DESCRIPTION OF THE PREFERRED EMBODIMENTS

Exemplary Embodiments of the present invention will be described with reference to the relevant drawings.

Exemplary Embodiment 1

Figure 1:
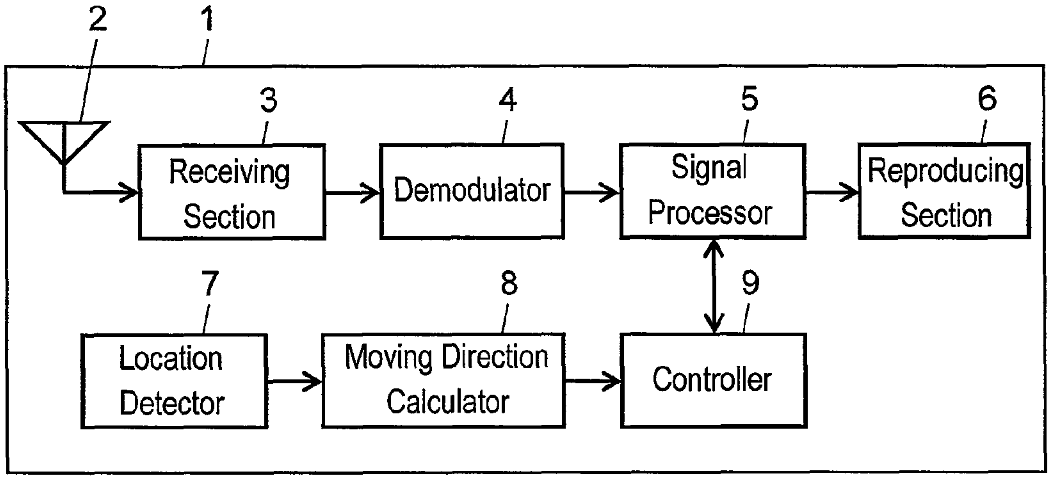
FIG. 1 is a block diagram of a receiving apparatus in accordance with Exemplary Embodiment 1 of the present invention.

A receiving apparatus according to Exemplary Embodiment 1 will be described with reference to FIG. 1. FIG. 1 is a block diagram of the receiving apparatus according to Embodiment 1.

Receiving apparatus 1 shown in FIG. 1 is, for example, a radio tuner mounted to a vehicle. Receiving apparatus 1 includes antenna 2 and receiving section 3 connected to an output port of antenna 2. Demodulator 4, signal processor 5 and reproducing section 6 are connected to an output port of receiving section 3 in this order. Receiving apparatus 1 further includes location detector 7, moving direction calculator 8 connected to an output port of location detector 7, and controller 9 connected to an output port of moving direction calculator 8. Controller 9 is connected to signal processor 5.

Receiving apparatus 1 will be described in detail below.

Receiving section 3 receives a digital radio broadcast of digital audio broadcasting (DAB) system via antenna 2. The radio broadcast received by receiving section 3 is demodulated by demodulator 4, decoded by signal processor 5, and reproduced by reproducing section 6, an audio output device, such as a speaker.

Location detector 7 is implemented by, for example, a global positioning system (GPS) receiver, and detects the current location of receiving apparatus 1 by predetermined time intervals.

Moving direction calculator 8 calculates a moving direction of receiving apparatus 1 according to the location of receiving apparatus 1 detected by location detector 7. For example, moving direction calculator 7 calculates the moving direction based on the difference of the current latitude and longitude from the latitude and longitude of apparatus 1 previously detected.

According to the moving direction calculated by moving direction calculator 8, controller 9 allows reproducing section 6 to selectively reproduce a part of or all of the radio broadcast received by receiving section 3.

An operation of controller 9 will be described in detail below.

First, controller 9 determines a destination area which receiving apparatus 1 moves to according to the moving direction calculated by moving direction calculator 8. Then, controller 9 compares the determined destination area with an area determined from transmitter identification information (TII) contained in the digital radio broadcast received by receiving section 3. The TII shows the location (i.e., the latitude and the longitude) of the station transmitting the broadcast. That is, controller 9 receives a signal decoded and supplied from signal processor 5, and analyses the TII contained in the signal so as to determine whether or not the received radio broadcast is transmitted from the destination area that receiving apparatus 1 moves to. If the broadcast is transmitted from the destination area, controller 9 supplies, to signal processor 5, a signal for allowing reproducing section 6 to reproduce the radio broadcast. Then, the digital radio broadcast decoded by signal processor 5 is reproduced by reproducing section 6, an audio output device, such as a speaker. On the other hand, if the radio broadcast is transmitted from an area different from the destination area that receiving apparatus 1 moves to, controller 9 supplies, to signal processor 5, a signal for preventing reproducing section 6 from the radio broadcast. In this case, the digital radio broadcast decoded by signal processor 5 is not reproduced by reproducing section 6, the audio output device, such as a speaker. Thus, reproducing section 6 reproduces the radio broadcast selectively based on the judgment result showing whether or not the radio broadcast is transmitted from the destination area that receiving apparatus 1 moves to.

In a digital audio broadcasting system, a broadcast transmitted from a broadcast station may be often relevant to the area where the broadcast station exists. If the radio broadcast received by receiving apparatus 1 is transmitted from the destination area that receiving apparatus 1 moves to, controller 9 supplies, to signal processor 5, the signal for allowing reproducing section 6 to reproduce the radio broadcast. Thus, if the radio broadcast is relevant to the destination area, reproducing section 6 selectively reproduces the radio broadcast.

As described above, receiving apparatus 1 according to embodiment 1 includes receiving section 3 for receiving a broadcast, location detector 7 for detecting the location of receiving apparatus 1, moving direction calculator 8 for calculating a moving direction of apparatus 1 based on the location detected by location detector 7, and controller 9 for allowing the reproducing section to reproduce a part of or all of the broadcast received by receiving section 3 selectively based on the moving direction calculated by moving direction calculator 8. This structure prevents an emergency broadcast unnecessary for a user from interrupting a broadcast the user listens to. That is, if an emergency broadcast, such as traffic information, is delivered, a conventional receiving apparatus reproduces the emergency broadcast while allowing the emergency broadcast to interrupt a broadcast the user listens to. However, receiving apparatus 1 according to Embodiment 1 determines that traffic jam information in the destination area which the user moves to is transmitted from the destination area, and, based on the determination result, controller 9 allows reproducing section 6 to selectively reproduce the information. That is, even in the case that an emergency broadcast to interrupt an ordinary broadcast is delivered, if controller 9 determines that the emergency broadcast is transmitted not from the destination area, reproducing section 6 does not reproduce the emergency broadcast, thus effectively providing the user with emergency broadcast useful for the user.

Receiving apparatus 1 may not be the radio tuner, and may be a tuner for receiving a television broadcast. In that case, reproducing section 6 is a video output device, and selectively reproduces not only audio broadcasts but also teletext broadcasts, such as data broadcasts. The receiving apparatus effectively provides the user with an emergency broadcast useful for the user.

Controller 9 may include an input section for allowing the user to operate the controller. In that case, the user's operation may temporarily deactivate the function preventing reproducing section 6 from reproduce an emergency broadcast or traffic jam information if controller 9 determines that the emergency broadcast or the traffic jam information is transmitted from the destination area. This operation allows the receiving apparatus to always reproduce the traffic information at a place where the user travels to a far place.

Exemplary Embodiment 2

Exemplary Embodiment 2 will be described with reference to FIG. 2. Components identical to those of Embodiment 1 will not be described in detail, and characteristic feature will be described.

Figure 2:
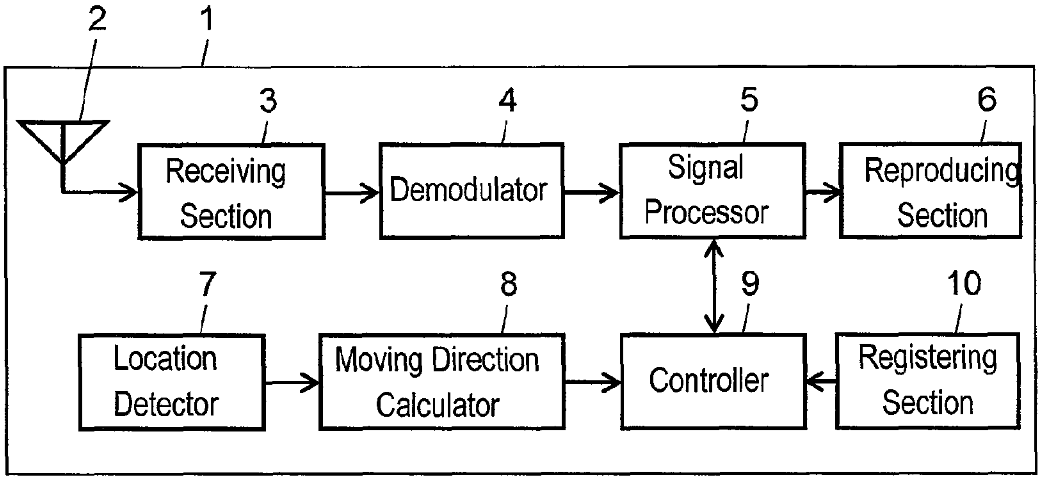
FIG. 2 is a block diagram of a receiving apparatus in accordance with Exemplary Embodiment 2 of the invention.

According to Embodiment 2 different from Embodiment 1, registering section 10 is connected to an input port of controller 9, as shown in FIG. 2.

A user registers area data of an arbitrary area with registering section 10. For example, the area data relates to the area the user often moves to, and contains data of the latitude and longitude of the area. The data of the latitude and longitude may be determined based on the name of the area input by the user.

Controller 9 allows reproducing section 6 to reproduce a part of or all of broadcast received by receiving section 3 selectively based on a moving direction of receiving apparatus 1 calculated by moving direction calculator 8 and on the area data registered in registering section 10.

An operation of controller 9 of receiving apparatus 1 according to Embodiment 2 will be described in detail below.

First, controller 9 determines a destination area which receiving apparatus 1 moves to based on a moving direction calculated by moving direction calculator 8 and the area data registered with registering section 10. Then, controller 9 compares area data of the determined area with the aforementioned TII. If the received radio broadcast is transmitted from the moving direction of receiving apparatus 1 and if a broadcast station transmitting the broadcast is located at the area having the area data registered with the registering section, controller 9 supplies, to signal processor 5, a signal for allowing reproducing section 6 to reproduce the radio broadcast. On the other hand, if the received radio broadcast is transmitted from a direction different from the moving direction of receiving apparatus 1 or if the broadcast station transmitting the broadcast is located in an area different from the area having the registered area data, controller 9 supplies, to signal processor 5, a signal from preventing reproducing section 6 from reproducing the broadcast.

The area data registered with registering section 10 relates to, for example, an area which the user often moves to. Traffic information of areas having area data registered may often be useful to the user. If the received radio broadcast is transmitted from the moving direction of receiving apparatus 1 and if the broadcast station transmitting the broadcast is located in the area having the area data registered with registering section 10, reproducing section 6 selectively reproduce the received broadcast, thereby efficiently providing the user with information useful for the user.

According to Embodiment 2, controller 9 allows reproducing section 6 to reproduce a radio broadcast based on to the area data registered with registering section 10. Controller 9 may allow reproducing section 6 to reproduce a radio broadcast based on a historical record of the moving location detected by moving location detector 7. An operation of receiving apparatus 1 in this case will be described below.

Figure 3:
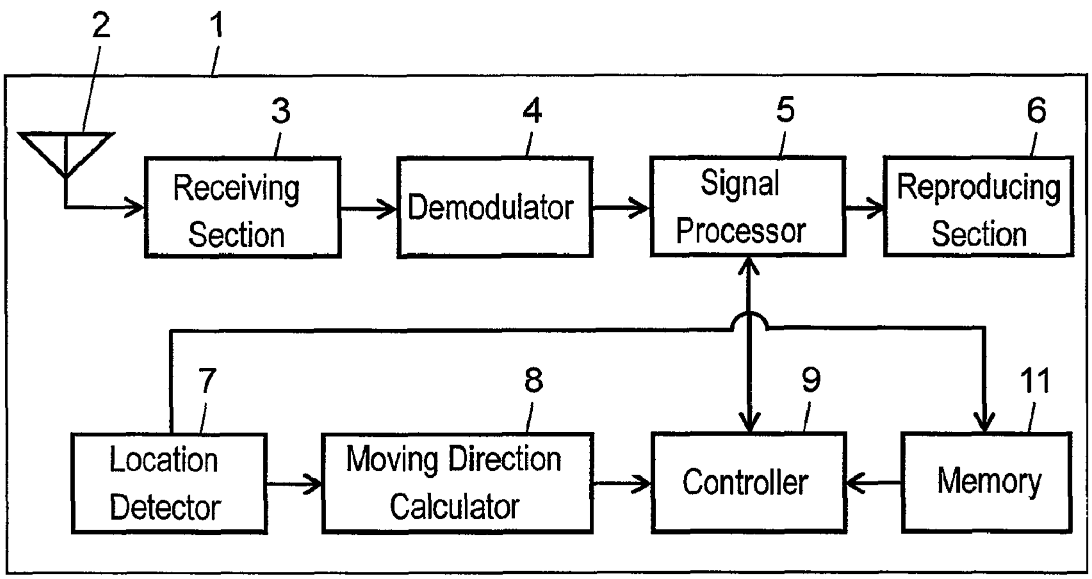
FIG. 3 is a block diagram of another receiving apparatus in accordance with Embodiment 2.

As shown in FIG. 3, receiving apparatus 1 includes memory 11 connected to an output port of moving direction detector 7 and to an input port of controller 9. Memory 11 stores the historical record of the moving of receiving apparatus 1 detected by moving location detector 7. Controller 9 automatically selects the area that the user often moves to based on the historical record of the moving of receiving apparatus 1 stored in memory 11. For determining the frequently visited area, receiving apparatus 1 may select, based on the historical record, top three or five areas from the areas listed in the order of decreasing the period of time when the receiving apparatus receives a broadcast. The number of the selected areas may be determined by the user.

Controller 9 determines the destination area which receiving apparatus 1 moves to based on the moving direction calculated by moving direction calculator 8 and on the area which the user often moves to. The, controller 9 operates as described above. Receiving apparatus 1 allows the user not to register the area data.

INDUSTRIAL APPLICABILITY

A receiving apparatus according to the present invention effectively provides a user with a broadcast useful for the user, thus being useful as a receiving apparatus mounted to a vehicle and a receiving apparatus accommodated in portable terminal.

The invention claimed is:

1. A receiving apparatus comprising:

a receiving section for receiving a broadcast and a location of a transmitter transmitting the broadcast;

a reproducing section for reproducing the broadcast;

a location detector for detecting a location of the receiving apparatus;

a moving direction calculator for calculating a moving direction of the receiving apparatus based on the location of the receiving apparatus; and a controller for determining a destination area of the receiving apparatus based on the moving direction, the controller comparing the location of the transmitter to the destination area of the receiver, and based on the comparison:

allowing the reproducing section to reproduce a part of or all of the broadcast when the location of the transmitter is in the destination area of the receiving apparatus, and preventing the reproducing section from reproducing the broadcast when the location of the transmitter is outside of the destination area of the receiving apparatus.

2. The receiving apparatus of claim 1, further comprising a registering section for registering area data of an arbitrary area from outside, wherein the controller allows the reproducing section to reproduce the part of or all of the broadcast received by the receiving section selectively based on the area data registered with the registering section.

3. The receiving apparatus of claim 1, further comprising a memory for storing a historical record of moving of the receiving apparatus detected by the location detector, wherein the controller selects an area that the receiving apparatus often moves to based on the historical record of the moving of the receiving apparatus stored in the memory, and the controller allows the reproducing section to reproduce the part of or all of the broadcast received by the receiving section selectively based on the area data of the area.

4. The receiving apparatus of claim 1, wherein the broadcast is an emergency broadcast interrupting to be reproduced while an ordinary broadcast is reproduced.

* * * * *